March 17, 1931. J. W. HOOLEY 1,796,521
PANEL CABINET FOR ELECTRICAL CONNECTIONS
Filed April 3, 1930 3 Sheets-Sheet 2
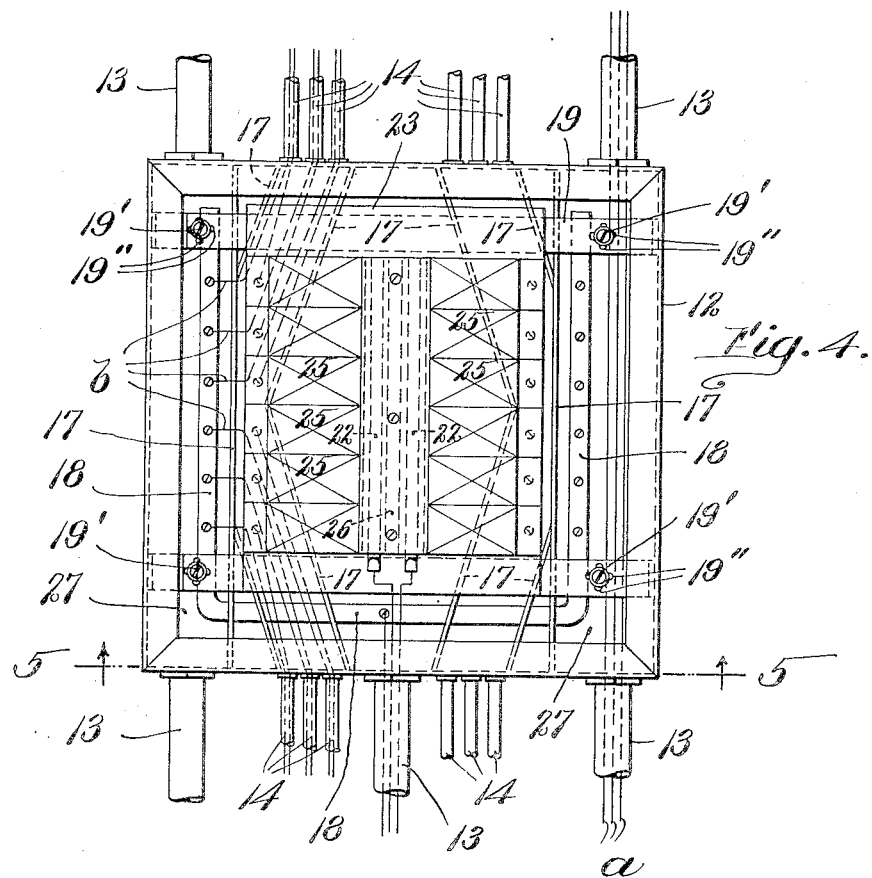
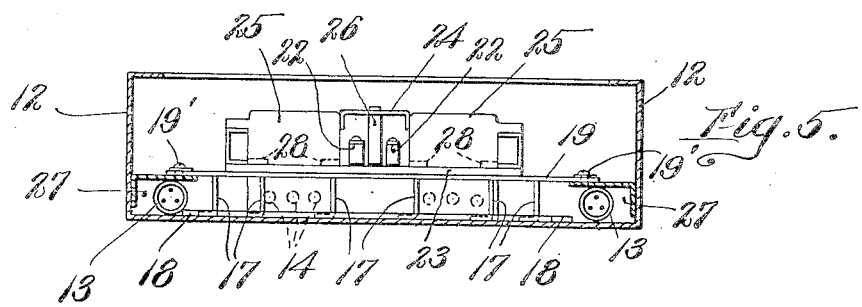
Inventor:
John W. Hooley
by N. W. Harrison atty.

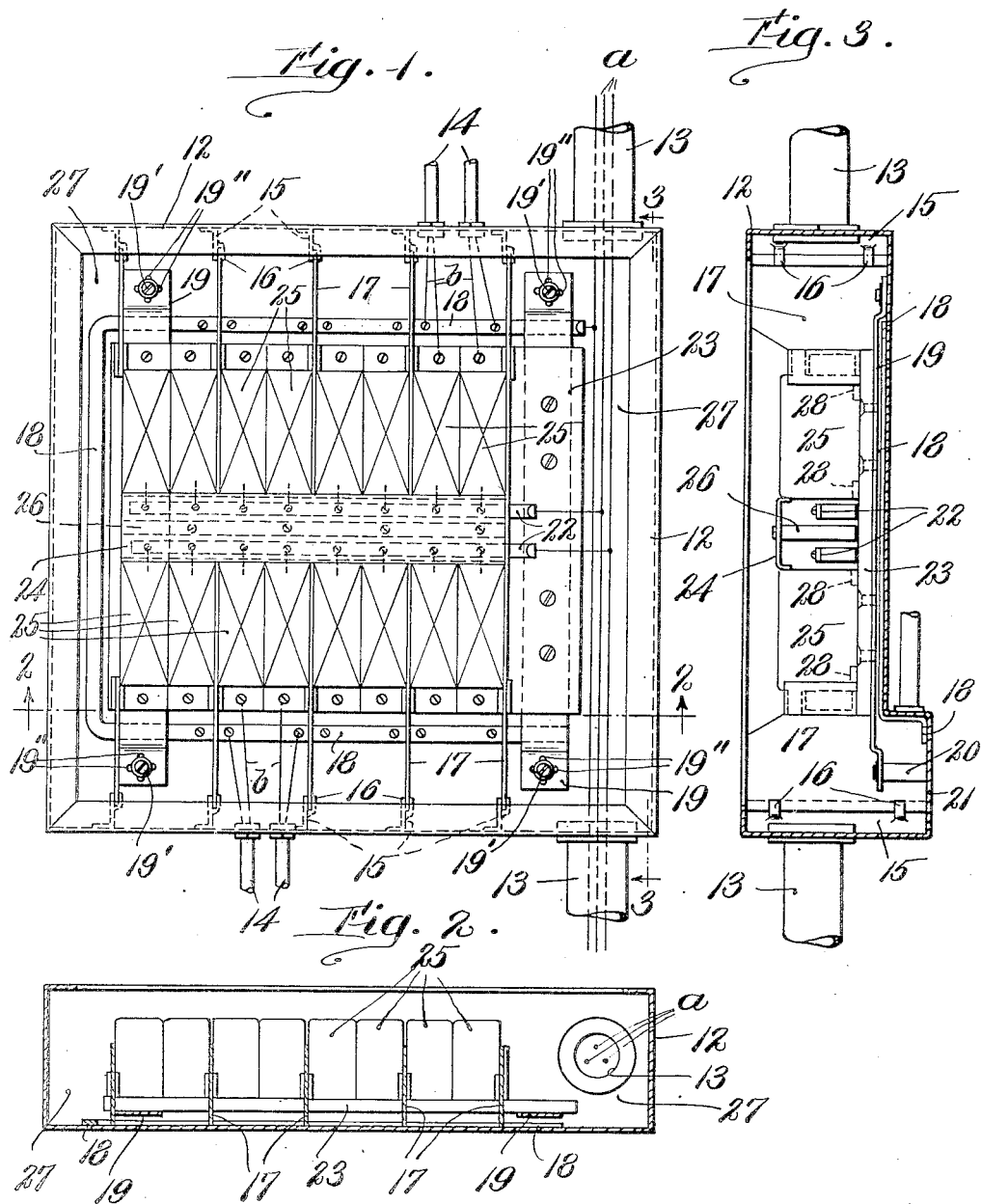

March 17, 1931.  J. W. HOOLEY  1,796,521
PANEL CABINET FOR ELECTRICAL CONNECTIONS
Filed April 3, 1930    3 Sheets-Sheet 3
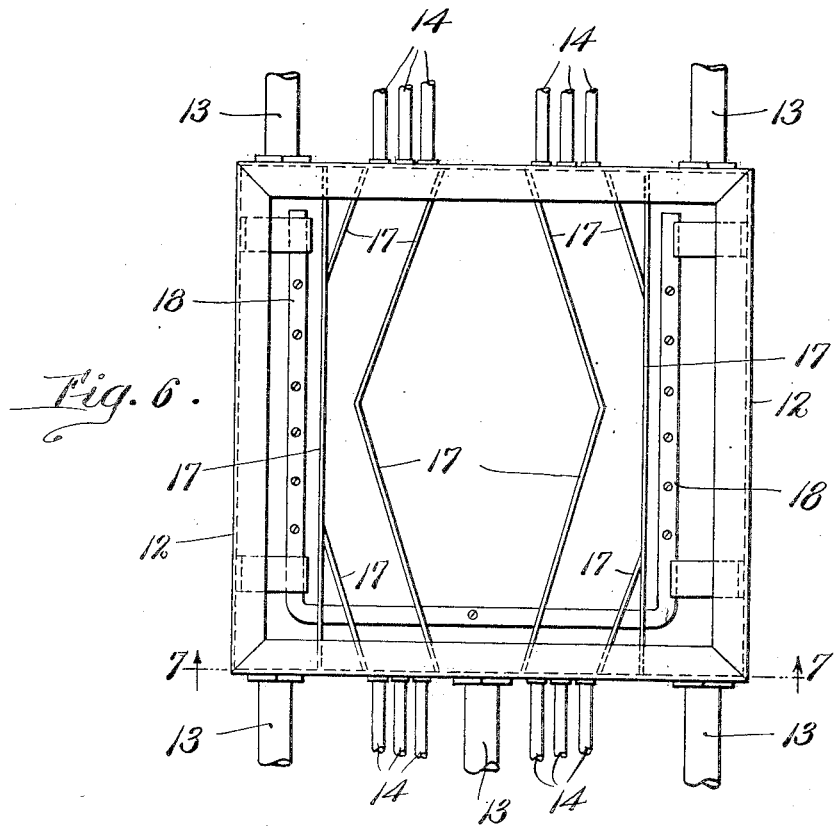
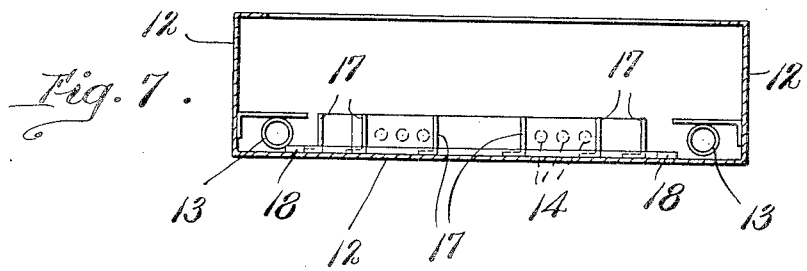
Inventor:
John W. Hooley
by  Atty.

Patented Mar. 17, 1931

1,796,521

UNITED STATES PATENT OFFICE

JOHN W. HOOLEY, OF LARCHMONT, NEW YORK, ASSIGNOR TO HIXLEY ELECTRIC COMPANY, INC., A CORPORATION OF NEW YORK

PANEL CABINET FOR ELECTRICAL CONNECTIONS

Application filed April 3, 1930. Serial No. 441,266.

This invention relates to boxes or cabinets for the accommodation and reception of panel boards, distributing boards, switch boards, interconnection boxes for signal systems such as telephones, bells, and any board that may be used for distributing light and power, wiring connections or wires or conductors.

At present, those interested in electrical work, such as electrical engineers, manufacturers and underwriters, limit the number of conductors in conduits, and such conductors are held to this limitation until they enter a panel or connection box, or so-called pull box or junction box. Then the conductors are generally crossed and run in haphazard manner in order to make connections to the circuit protecting or other devices in the panel cabinet.

One of the objects of my invention is to provide an improved panel cabinet which will permit the unitizing of the conductors within a given area.

With the advance of electrical work, particularly in the alternating current fields, a common neutral may be employed for a multiple of phases or circuits; as for example in a three phase four wire system, the fourth wire would be the neutral wire to the other three wires. For such purposes, another object of my invention is to provide a cabinet having a connecting bar or strip fastened thereto permanently and practically forming a part of the cabinet or box and affording a prearranged permanent location for the connection of certain circuit wires, with the neutral or common wire conductor consisting of said bar or strip.

With the above objects in view, and others hereinafter explained, the invention consists in the construction of the cabinet, and the combinations of the parts thereof, substantially as hereinafter described and claimed.

Of the accompanying drawings:—

Figure 1 is a front elevation of my improved cabinet in one of its forms, the usual front door or panel thereof being omitted.

Figure 2 represents a section on line 2—2 of Figure 1.

Figure 3 represents a section on line 3—3 of Figure 1.

Figure 4 is a view similar to Figure 1, illustrating another embodiment of my invention.

Figure 5 represents a section on line 5—5 of Figure 4.

Figures 6 and 7 are views similar to Figures 4 and 5 but omitting many of the details in order to more clearly show the barriers or division strips.

Similar reference characters indicate similar parts or features in all of the views.

The cabinet or box proper 12, of suitable sheet material, is illustrated as having feeder conduits 13 and branch conduits 14 connected and secured thereto in any suitable manner. As best illustrated by Figures 1 and 3, elbow strips 15 project inwardly from the upper and lower walls of the box, said strips having lugs 16 to which the barrier or division strips 17 are secured. Said strips 17 provide raceways between them for the branch or circuit wiring.

The hereinbefore referred to neutral or common wire conductor is illustrated as comprising the bar or strip 18 having a multiplicity of binding screws or other suitable means for connecting other conductors as presently explained. Said bar 18 is practically a part of the box or cabinet, being welded or otherwise secured thereto, and automatically provides a permanent ground connection for the conductors which are connected thereto. This is because the box or cabinet, of which said neutral bar 18 is a part, is secured to conduits such as those illustrated at 13, and which are, in practice, grounded as usual such as to water piping. This unitizes the entire system of cabinet connections so far as concerns grounding of the necessary circuits and connections.

As illustrated in the drawings, the neutral bar 18 has sufficient body to support and carry devices for connecting circuit wires thereto. Therefore said neutral bar might be an integral portion of the cabinet wall instead of a strip welded thereto.

Secured to the back wall of the cabinet are two strips 19, so shaped and mounted as to be spaced away from said wall except at their upper ends. Their lower ends are connected by studs or posts 20 to the wall of the projecting chamber 21 when the cabinet is made to include such chamber.

The bus bars 22 and the mounting thereof will be described hereinafter.

A plate 23 is suitably secured to or mounted on the two strips 19, as by suitable screws, and is thereby so spaced from the rear wall of the cabinet as to provide a barrier creating a false space behind it, which space may be utilized as a raceway for conducting wiring. The screws 19' which secure the strips 19 to the back wall pass through cross slots 19'' in said strips, to enable the mechanism in the box to be adjusted in any direction to compensate for any imperfect mounting of the cabinet in or on a wall, or to enable accurate mounting of the parts to be effected within the cabinet.

As illustrated in Figure 3, a cover plate 24 for the bus bar 22 is mounted on a division or barrier plate 26 projecting from the base plate 23 and, in practice, insulated therefrom. The bus bars 22 are illustrated as similarly mounted.

As illustrated in Figures 1 and 3, the structure is such as to provide gutter spaces 27 to be occupied by main feeders or conductors $a$ $a$ free from interference with the circuit connections entering through the conduits 14.

Since the proper wiring for the connections will be readily understood by anyone skilled in the art, no detailed illustration and description thereof is necessary herein. To illustrate such, completely, would confuse the illustration of the mechanisms or devices in the cabinet.

The circuit controlling or protection devices are diagrammatically indicated at 25. They may be of any well-known or preferred type, removably mounted in the spaces between the barriers 17. They are so associated with the bus bars 22 and the contact plates or strips 28 to which the wiring $b$ $b$ is connected, as to automatically make the proper connections when fitted in place.

In general principles, the cabinet illustrated by Figures 4, 5, 6 and 7 is the same as in the other figures already described. The main difference is that instead of the barriers or division strips 17 being parallel with the side walls of the cabinet, they are inclined relatively thereto. Specifically, said strips in Figures 4 to 7 are relatively positioned in the form of a diamond. But as in the other figures, the raceways between the strips 17 serve to enable all conductors and circuit wiring to be unitized.

In said Figures 4 to 7, however, I illustrate an important feature of novelty in that by such structure, it is possible to provide a compartment gutter along two sides of the cabinet to enable main feeders or large conductors to pass through the cabinet to serve other sources of supply, and be isolated completely from mechanisms or connections in the cabinet, thus enabling the cabinet to be used as a pull box.

As best illustrated by Figure 5, a predetermined space is provided between the well of the cabinet and the plate 23, said space being wide enough to accommodate all necessary wires, conductors, and conduits. By this structure a space is provided between the cabinet wall and the plate 23 which supports the mechanisms 25, and said space is divided by the barriers 17 into raceways, said raceways unitizing all conductors within them, and providing compartments which guard the conductors from being interfered with.

Having now described my invention, I claim:—

1. A multiple circuit electrical distributing device comprising in combination a metallic cabinet having electrical conduit connections, a plurality of circuit controlling devices mounted within the cabinet in contiguous relationship, common supply bus bars positioned in the cabinet to serve each of the control devices, and a unitary grounded bus bar electrically and mechanically connected to the box and positioned to pass adjacent the service end of each of the control devices, and connection means on the grounded bar adjacent each control device.

2. A multiple circuit electrical distributing device comprising a cabinet having electrical conduit connections, a plurality of circuit controlling devices mounted within the cabinet in contiguous relationship and spaced from the cabinet side walls, common supply bus bars positioned in the cabinet to serve each of the control devices, barrier partitions between adjacent control devices and each extending beyond the respective control devices to the respective side wall of the cabinet to provide individual passages for the respective service conductors of the control devices.

In testimony whereof I have affixed my signature.

JOHN W. HOOLEY.